Dec. 8, 1964 A. VAUGOYEAU 3,160,407
RUBBER SPRING
Filed Feb. 27, 1962 2 Sheets-Sheet 1
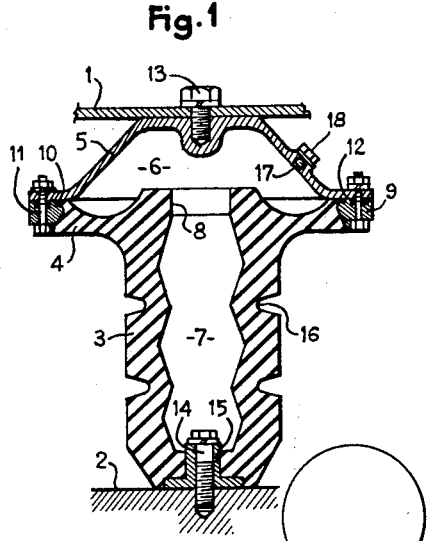
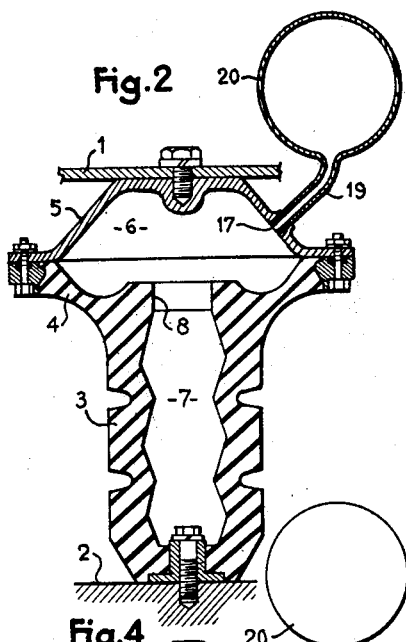
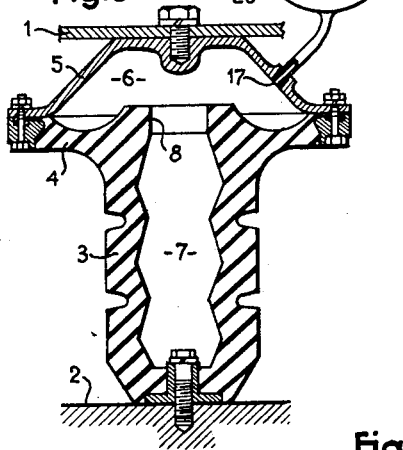
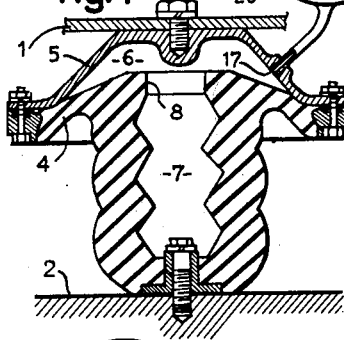
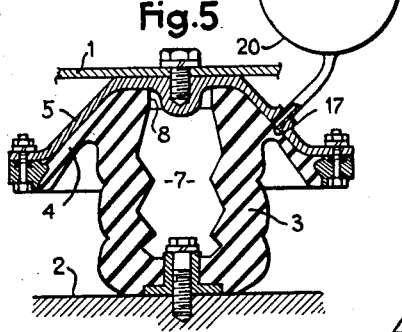
INVENTOR
ALEXANDRE VAUGOYEAU
BY LeBlanc & Shur
ATTORNEYS

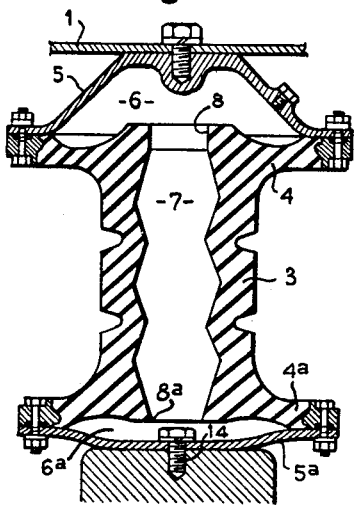
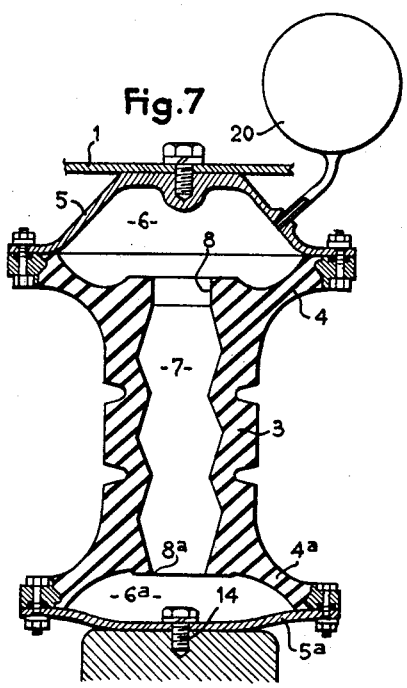
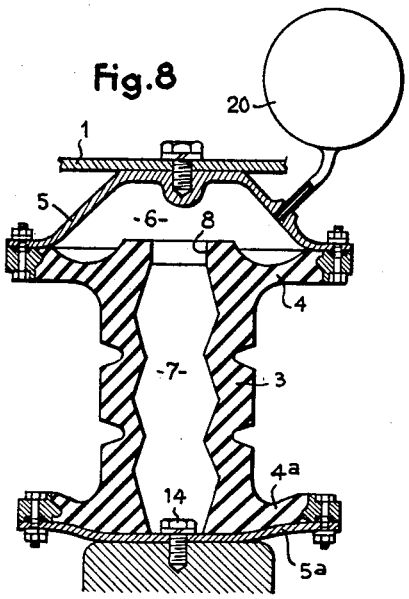

United States Patent Office 3,160,407
Patented Dec. 8, 1964

3,160,407
RUBBER SPRING
Alexandre Vaugoyeau, Marseille, France, assignor to Etablissements Hutchinson (Compagnie Nationale du Caoutchouc), Paris, France, a French body corporate
Filed Feb. 27, 1962, Ser. No. 179,506
Claims priority, application France, June 1, 1961, 863,618
8 Claims. (Cl. 267—35)

It is now well known to utilize the compression of rubber to constitute elastic elements which replace steel springs in various applications and in particular in vehicle suspensions.

Interesting results have already been obtained, but it has been found that, despite its advantages, this utilization is of limited scope, since although the rubber possesses great elastic properties, it is not possible to compress it beyond a certain limit without causing its rapid destruction.

In practice, it is hardly possible to compress rubber to an extent exceeding ⅓ of its length in the free state.

Thus, if it is necessary to obtain a large deflection of the rubber, as in the case of, for example, suspensions for automobiles which need to be very soft, use must be made of masses of rubber of great length which not only are often impossible to house, but have moreover a tendency to bend instead of compressing which completely impairs the results and renders them useless.

Constructors have tried to solve this difficulty and they have indeed succeeded in improving the behaviour of rubber for springs by adopting shapes of better design or by combining steel and rubber.

However, these improvements are insufficient and rubber in the construction of spring devices is still in limited use.

The object of the present invention is to provide a spring device which avoids said disadvantages.

Further features and advantages of the invention will be apparent from the ensuing description with reference to the accompanying drawings to which the invention is in no way limited.

In the drawings:

FIGS. 1 to 5 are longitudinal sectional views of an embodiment of a spring according to the invention at various stages of its compression, and FIGS. 6 to 8 are views, similar to some of FIGS. 1 to 5, of another embodiment of a spring according to the invention.

Throughout the figures, elements which are identical or perform the same function carry identical reference characters.

FIGS. 1 to 5 show a spring device inserted between two elements 1 and 2 whose relative displacements are required to be damped. The spring device comprises a membrane connected in fluid-tight manner to a rigid bell 5, for example of metal. This bell is so shaped that in the free state (position shown in FIG. 1) a free space or cavity 6 is provided therebetween and the membrane 4. This free space communicates with an inner chamber or cavity 7 of a block 3, integral with the membrane 4, by way of an aperture 8 constituting the escape aperture of the chamber.

A fluid-tight connection between the bell 5 and the membrane 4 is obtained in the following manner. A metal ring 9 is fixed by chemical bonding to the periphery of the membrane 4, a part of the latter slightly protruding in the upper part in the form of an annular projection 10. Bolts 11 extend through the ring 9 and a flange terminating the bell 5 permits clamping the latter to the membrane 4, fluid-tightness being achieved by the crushing of the projection 10 and a sealing ring 12.

The spring device can be connected to the faces 1 and 2 very simply by means of screws 13 and 14, the first screw being disposed in the bell 5 and the second extending through the bottom of the block 3 with interposition of a metal bushing which is made to bond to this bottom, the screw 14 being screwed in element 2.

The block 3 comprises on its outer periphery annular recesses 16 which facilitate its compression.

The bell 5 comprises a tapped hole 17 and this hole is shown in FIG. 1 as being closed by a plug 18 so as to illustrate the free state position of the spring device.

In the presently-described embodiment, the hole 17 is provided for receiving a pipe 19 connected to a source of compressed gas 20, such as compressed air.

This embodiment operates in the following manner. In the absence of load (FIG. 2), the pressure of the gas from the source 20 exerts a pressure on the bell 5 and deforms the membrane 4 until the stress to which the latter is subjected balances the thrust of the gas. This results in an increase in the volume of the space 6 and in an overall length of the spring device which is greater than its free length shown in FIG. 1.

It should be noted that the pressure of the gas does not need to be high as the membrane 4, initially in the form of an almost flat disc, is very easily deformable. If the spring device is then subjected to a light load, its flattening commences immediately because the membrane 4, which has a tendency to resume its initial position, acts in the same direction as the load up to the moment when the position shown in FIG. 3, which is similar to that shown in FIG. 1, is reached. In this position, it is solely the pressure of the gas acting on the membrane 4 which balances the load.

With increasing load the membrane 4 is downwardly deformed (FIG. 4). It is then the pressure of the gas acting on the membrane 4 added to the elastic resistance opposed by the deformation of this membrane which balances the load.

If the latter increases still more, the membrane 4 gives way little by little under the load and opposed an increasing resistance until the moment when it fits against the inner face of the bell 5 (FIG. 5). The latter rests against the block 3 and closes the aperture 8 of the chamber 7, the communication with the source 20 being, furthermore, cut off.

Thenceforth, the membrane 4 is no longer able to deform and it is the block 3 which, by its deformation and by the compression of the gas enclosed in the small volume of the chamber 7, permits balancing the load; but as the block is well seated in the bell 5 it supports under excellent conditions the compressive force to which it is subjected.

Thus, the invention permits providing suspension spring devices whose total deflection travel is very great relative to their free length, these spring devices being very soft owing to the fact that the various operating elements come into action successively and in a continuous manner.

The force opposed by these spring devices to their compression is much smaller at the beginning than at the end of their travel and a deflection curve of hyperbolic type is obtained, which is always desirable in suspensions for vehicles and in particular automobiles.

Furthermore, it is possible to still further improve the operation of the spring device just described by means of the alternative embodiment shown in FIGS. 6 to 8.

FIG. 6 shows this embodiment in the position corresponding to that shown in FIG. 1 and FIG. 7 shows the embodiment in the position corresponding to FIG. 2.

As can be seen from a comparison of FIGS. 3 and 6, the alternative embodiment differs from the previous embodiment only in respect to the addition at the base of the spring device of a second membrane 4a and a second bell 5a. The membrane 4a is connected to the block 3 in the same manner as the membrane 4 and is connected in the fluid-tight manner to the bell 5a in the same manner as the membrane 4 is connected to the bell 5.

In the presently described embodiment, the membrane 4a has a diameter smaller than that of the membrane 4 but this arrangement is not essential.

The bell 5a is in spaced relation to the membrane 4a thereby providing a free space or cavity 6a which communicates by way of an aperture 8a with the chamber or cavity 7 and the space 6. As the latter is in communication with the source 20 of compressed gas, the spaces 6 and 6a are increased in size (FIG. 7) relative to the position in the free state (FIG. 6) and the spring device is lengthened.

If at this moment a compressive load is applied to the spring device, the membrane 4a starts to deform so as to assume its initial position, since its surface area is smaller than that of the membrane 4, and finally comes into contact with the transverse wall of the bell 5a, as shown in FIG. 8. Thenceforth the spring device acts in the manner of a spring device of the preceding embodiment and deforms in the same manner.

Thus, owing to the addition of the bell 5a, it is possible to obtain an even greater deflection than in the case of the spring device shown in FIG. 1.

As the deformation at the beginning requires a force which is less than in the case of the spring device shown in FIG. 1, the deflection curve is flatter than in the case of the spring device shown in FIG. 1, but the principle of operation remains the same.

The advantages of the spring device according to the invention will be clear from the foregoing description. The invention can however, be adapted to each particular case by an appropriate choice of the diameters, of the thicknesses of the elements of rubber or like elastomer and of the depths of the bells 5 and 5a.

It should be noted that the gas from the source 20 is always used under low pressure, since it merely serves to balance the small loads. This eliminates the bouncing encountered in springs in which gas is used for balancing the entire load and is consequently at higher pressure.

Although specific embodiments of the invention have been described, many modifications and changes may be made therein without departing from the scope of the invention as defined in the appended claims.

Having now described my invention what I claim as new and desire to secure by Letters Patent is:

1. A spring device for insertion between two elements for the purpose of providing an elastically yieldable connection between said elements, said spring device comprising a block having an axis and a first end and a second end, a first rigid member adapted to bear against one of said elements and located adjacent the first end of the block, a second rigid member adapted to bear against the other of said elements and located adjacent the second end of the block, the block having a first peripheral flange adjacent the first end and a second peripheral flange adjacent the second end, the first and second flanges having outer annular portions secured in a fluid-tight manner respectively to the first and second rigid members, the block and flanges being composed of an elastomer, the block being axially deformable and the flanges being capable of bending before compression of the block in operation of the spring device so that the first end and the first flange constitute a first deformable membrane and the second end and the second flange constitute a second deformable membrane, the first membrane and the first rigid member defining a first fluidtight cavity and the second membrane and the second rigid member defining a second fluidtight cavity, a large passageway extending through the block and putting the first cavity in communication with the second cavity, a source of gas located outside the block and rigid members, the passageway and the cavities constituting a fluidtight gas enclosure and a second passageway putting the source of gas in communication with the enclosure, the surface area of one of said membranes being smaller than that of the other membrane, whereby said one of the membranes is deformed before the other membrane in operation of the spring device.

2. A spring device as claimed in claim 1, wherein the membrane having the larger surface area is the first membrane.

3. A spring device for insertion between two elements for the purpose of cushioning the relative displacements of said elements, said spring device comprising a block having a longitudinal axis and a first end adapted to bear against one of said elements, and a second end remote from the first end, a substantially cup-shaped rigid member adapted to bear against the other of said elements, a peripheral flange formed on the block adjacent said second end and extending radially substantially in a plane perpendicular to said axis and constituting in combination with the block a membrane having a peripheral annular portion connected in a fluidtight manner to the rigid member, the block and the flange thereon defining with the rigid member a first fluidtight cavity having a deformable wall, a second fluidtight cavity formed in the block and communicating with the first cavity, the block and flange being composed of a deformable elastomer, means defining a reservoir located outside the block and the rigid member, a passageway formed in the rigid member and putting the reservoir in permanent communication with the first cavity in both directions of flow through the passageway, the first and second cavities, the passageway and the reservoir constituting a fluidtight enclosure, and a compressible fluid filling the enclosure, the resistance to axial deformation of the flange relative to the resistance to axial deformation of the block and the location of the passageway being such that the flange is applied closely against the rigid member in the region thereof containing the passageway and thereby closes the passageway before the block has been fully axially deformed and shortened in the operation of the spring device.

4. A spring device for insertion between two elements for the purpose of providing an elastically yieldable connection between said elements, said spring device comprising a block having an axis and a first end and a second end remote from the first end, the second end being adapted to bear against one of said elements, a rigid member adapted to bear against the other of said elements and located adjacent the first end of the block, the rigid member having an annular wall portion which is divergent in the direction of the block, the block having a peripheral flange adjacent said first end and extending substantially in a plane perpendicular to said axis, the annular wall portion, the block and the flange being in coaxial relation, the flange having an outer peripheral portion secured in a fluidtight manner to the annular wall portion, the block and flange being composed of an elastomer, the block being axially deformable so as to shorten in operation of the spring device and the flange being capable of bending and stretching and applying itself against substantially the whole of the annular wall portion in a progressive manner as the spring device is subjected to an increasing progressive load before the block has fully shortened in operation of the spring device so that the first end and the flange constitute a deformable membrane, the rigid member and the membrane defining a first fluidtight cavity, the block having a large second fluidtight cavity which communicates with the first cavity, means defining a reservoir located outside the block and the rigid member, a free passageway formed in the annular wall portion and connected to the reservoir so as to put the interior of the reservoir in communication with the first cavity in both directions of flow through the passageway, the reservoir, the passageway and the first and second cavities constituting a fluidtight enclosure, and a gas filling the enclosure, the location of the passageway in the annular wall portion being such that the flange in being progressively applied against the annular wall portion progressively closes the passageway and progressively changes the spring rate.

5. A spring device as claimed in claim 3, wherein the passageway is located substantially mid-way of the axial extent of the annular wall portion whereby a part of the first cavity remains after closure of the passageway.

6. A spring device for insertion between two elements for the purpose of providing an elastically yieldable connection between said elements, said spring device comprising a block having an axis and a first end and a second end remote from the first end, a first rigid member adapted to bear against one of said elements and located adjacent the first end of the block, a second rigid member adapted to bear against the other of said elements and located adjacent the second end of the block, the block having a first peripheral flange adjacent the first end and a second peripheral flange adjacent the second end, the first and second flanges extending substantially in planes perpendicular to said axis in the unloaded condition of the spring device and having outer annular portions secured in a fluidtight manner respectively to the first and second rigid members, the block and flanges being composed of an elastomer, the block being axially deformable so as to shorten under compressive load and the resistance to deformation of the flanges being such that they are applied against the rigid members before the block has been fully deformed and shortened in operation of the spring device, the first end and the first flange constituting a first deformable membrane and the second end and the second flange constituting a second deformable membrane, the first membrane and the first rigid member defining a first fluidtight cavity and the second membrane and the second rigid member defining a second fluidtight cavity, a large passageway extending through the block and putting the first cavity in communication with the second cavity, a source of gas located outside the block and rigid members, the passageway and the cavities constituting a fluidtight gas enclosure, and a pipe mounted in the first rigid member and connected to the source of gas so as to put the source of gas in communication with the first cavity.

7. A spring device for insertion between two elements for the purpose of providing an elastically yieldable connection between said elements, said spring device comprising a block having an axis and a first end and a second end remote from the first end, a first rigid member adapted to bear against one of said elements and located adjacent the first end of the block, a second rigid member adapted to bear against the other of said elements and located adjacent the second end of the block, the block having a first peripheral flange adjacent the first end and a second peripheral flange adjacent the second end, the first and second flanges extending substantially in planes perpendicular to said axis in the unloaded condition of the spring device and having outer annular portions secured in a fluidtight manner respectively to the first and second rigid members, the block and flanges being composed of an elastomer, the block being axially deformable so as to shorten under compressive load and the resistance to deformation of the flanges being such that they are applied against the rigid members before the block has been fully deformed and shortened in operation of the spring device, the first end and the first flange constituting a first deformable membrane and the second end and the second flange constituting a second deformable membrane, the first membrane and the first rigid member defining a first fluidtight cavity and the second membrane and the second rigid member defining a second fluidtight cavity, the first rigid member being cup-shaped and having an annular wall portion which is divergent in the direction of the block and adjoins the outer annular portion of the first flange, the resistance to deformation of the first flange being such that the first flange is applied closely against the divergent annular wall portion in a progressively increasing area as the spring device is subjected to an increasing compressive load, a large passageway extending through the block and putting the first cavity in communication with the second cavity, a source of gas located outside the block and rigid members, the passageway and the cavities constituting a fluidtight gas enclosure, and a pipe mounted in the first rigid member and connected to the source of gas so as to put the source of gas in communication with the first cavity, the pipe being located in the first rigid member in the divergent annular wall portion in such position as to be progressively closed by the first flange before the block has been fully deformed and shortened in the operation of the spring device.

8. A spring device for insertion between two elements for the purpose of providing an elastically yieldable connection between said elements, said spring device comprising a block having an axis and a first end and a second end remote from the first end, a first rigid member adapted to bear against one of said elements and located adjacent the first end of the block, a second rigid member adapted to bear against the other of said elements and located adjacent the second end of the block, the block having a first peripheral flange adjacent the first end and a second peripheral flange adjacent the second end, the first and second flanges extending substantially in planes perpendicular to said axis in the unloaded condition of the spring device and having outer annular portions secured in a fluidtight manner respectively to the first and second rigid members, the block and flanges being composed of an elastomer, the block being axially deformable so as to shorten under compressive load and the resistance to deformation of the flanges being such that they are applied against the rigid members before the block has been fully deformed and shortened in operation of the spring device, the first end and the first flange constituting a first deformable membrane and the second end and the second flange constituting a second deformable membrane, having a surface area smaller than that of the first membrane, the first membrane and the first rigid member defining a first fluidtight cavity and the second membrane and the second rigid member defining a second fluidtight cavity, the first rigid member being cup-shaped and having an annular wall portion which is divergent in the direction of the block and adjoins the outer annular portion of the first flange, the resistance to deformation of the first flange being such that the first flange is applied closely against the divergent annular wall portion in a progressively increasing area as the spring device is subjected to an increasing compressive load, and finally applied closely against the whole of the annular wall portion before the block has been fully deformed and shortened in the operation of the spring device, a large passageway extending through the block and putting the first cavity in communication with the second cavity, a source of gas located outside the block and rigid members, the passageway and the cavities constituting a fluidtight gas enclosure, and a pipe mounted in the first rigid member and connected to the source of gas so as to put the source of gas in communication with the first cavity, the pipe being located in the first rigid member in the divergent annular wall portion in such position as to be progressively closed by the first flange before the block has been fully deformed and shortened in the operation of the spring device.

References Cited in the file of this patent

UNITED STATES PATENTS

| | | |
|---|---|---|
| 1,644,683 | Leipert | Oct. 11, 1927 |
| 2,037,033 | Lord | Apr. 14, 1936 |
| 2,447,712 | Nathan | Aug. 24, 1948 |
| 2,917,264 | Hartenstein | Dec. 15, 1959 |
| 2,930,607 | Hutzenlaub | Mar. 29, 1960 |
| 3,008,703 | Slemmons et al. | Nov. 14, 1961 |
| 3,037,764 | Paulsen | June 5, 1962 |

FOREIGN PATENTS

| | | |
|---|---|---|
| 852,040 | France | Oct. 13, 1939 |
| 1,269,203 | France | July 3, 1961 |
| 1,031,059 | Germany | May 29, 1958 |
| 1,065,669 | Germany | Sept. 27, 1959 |